US012308619B2

(12) United States Patent
Yoshimoto et al.

(10) Patent No.: US 12,308,619 B2
(45) Date of Patent: May 20, 2025

(54) NOBLE METAL TIP FOR SPARK PLUG, ELECTRODE FOR SPARK PLUG, AND SPARK PLUG

(71) Applicant: NGK SPARK PLUG CO., LTD., Nagoya (JP)

(72) Inventors: Osamu Yoshimoto, Nagoya (JP); Tomoo Tanaka, Nagoya (JP); Kengo Hattori, Nagoya (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 518 days.

(21) Appl. No.: 17/793,826

(22) PCT Filed: Feb. 2, 2021

(86) PCT No.: PCT/JP2021/003667
§ 371 (c)(1),
(2) Date: Jul. 19, 2022

(87) PCT Pub. No.: WO2021/161845
PCT Pub. Date: Aug. 19, 2021

(65) Prior Publication Data

US 2023/0119721 A1 Apr. 20, 2023

(30) Foreign Application Priority Data

Feb. 14, 2020 (JP) ................................ 2020-023207

(51) Int. Cl.
*C22C 5/04* (2006.01)
*H01T 13/39* (2006.01)

(52) U.S. Cl.
CPC ................ *H01T 13/39* (2013.01); *C22C 5/04* (2013.01)

(58) Field of Classification Search
CPC ................ C22C 5/04; C22C 5/00; C22F 1/14
See application file for complete search history.

(56) References Cited

U.S. PATENT DOCUMENTS

2010/0275869 A1 11/2010 Musasa et al.
2019/0296526 A1* 9/2019 Kikai ...................... H01T 21/02

FOREIGN PATENT DOCUMENTS

| | | | |
|---|---|---|---|
| CN | 1698245 | A | 11/2005 |
| JP | 2008-248322 | A | 10/2008 |
| JP | 2011-18612 | A | 1/2011 |
| JP | 2014-75296 | A | 4/2014 |
| JP | 2020-140800 | A | 9/2020 |
| WO | WO2007/091576 | A1 | 8/2007 |

OTHER PUBLICATIONS

Examination Report dated Feb. 14, 2023 from related/corresponding Chinese Patent Appl. No. 202180012395.5.
International Search Report from corresponding International Patent Application No. PCT/JP21/03667, dated Apr. 20, 2021.

* cited by examiner

*Primary Examiner* — Jessee R Roe
(74) *Attorney, Agent, or Firm* — RENNER, OTTO, BOISSELLE & SKLAR, LLP

(57) ABSTRACT

A noble metal tip for a spark plug according to the present invention contains iridium (Ir) in an amount of 50 mass % or more and aluminum (Al) in an amount of 0.1 mass % or more and 5 mass % or less, and further contains rhodium (Rh), wherein a metallographic structure comprised of fiber-like elements R is observed, and the fiber-like elements R of the metallographic structure have an average aspect ratio of 150 or more and have an average length of 25 μm or less in a minor axis direction.

8 Claims, 8 Drawing Sheets

NOBLE METAL TIP FOR SPARK PLUG, ELECTRODE FOR SPARK PLUG, AND SPARK PLUG

FIELD OF INVENTION

The present invention relates to a noble metal tip for a spark plug (hereinafter may be referred to as a "noble metal tip for spark plug"), to an electrode for a spark plug (hereinafter may be referred to as an "electrode for spark plug"), and to a spark plug.

BACKGROUND OF THE INVENTION

A spark plug is utilized as an igniter for an internal combustion engine such as an automotive engine. The spark plug has a center electrode and a ground electrode, and spark discharge occurs as a result of application of high voltage between these electrodes. An air-fuel mixture is ignited by the spark discharge. In order to improve ignition performance, a tip (igniting portion) mainly formed of a noble metal is provided on the electrodes of such a spark plug.

As a tip of such a type, a tip mainly formed of iridium (Ir) whose melting point is high has been widely used, because of, for example, excellent oxidation resistance and excellent wear resistance. However, in recent years, electrode temperature has been increasing due to, for example, an increase in the temperature of an environment in which an engine is used or an increase in the degree of supercharging. Therefore, there has been a problem that, when the above-described tip is used in a high-temperature atmosphere containing oxygen, iridium oxidizes and vaporizes easily, whereby the volume (mass) of the tip decreases.

In view of such circumstances, etc., there has been provided a technique for forming a film (protective film) of aluminum oxide on the surface of a tip by adding aluminum (Al) to iridium, thereby enhancing the oxidation resistance of the tip (see Japanese Patent Application Laid-Open (kokai) No. 2008-248322 "Patent Document 1"). This tip is obtained by arc-melting an alloy containing iridium and aluminum, making an ingot from the melted alloy, and cutting the ingot into a predetermined shape by using a fine cutter.

Since a large difference is present between the melting point (2,466° C.) of iridium and the melting point (660.3° C.) of aluminum and the melting point of aluminum is significantly lower than that of iridium, when an alloy containing iridium and aluminum is cooled after arc melting, solidifying segregation of aluminum is highly likely to occur. Since a tip in which aluminum has segregated during solidification has lower durability, when the tip is used as an electrode (igniting portion) of a spark plug, crystal grains come off from the tip, which may lower the ignition performance of the spark plug.

Also, when a mixed powder of iridium and aluminum is arc-melted, due to its influence, the powder is stirred up to some degree and flies away. At that time, since powdery aluminum whose specific gravity is small is easily stirred up and flies away, the composition ratio of the mixed powder deviates from a target value, thereby raising problems such as a problem that the performance of a tip finally obtained is unstable.

SUMMARY OF THE INVENTION

An object of the present invention is to provide a noble metal tip for spark plug, etc. which are excellent in durability.

Means for solving the above-described problems are as follows.

<1> A noble metal tip for spark plug which contains iridium (Ir) in an amount of 50 mass % or more and aluminum (Al) in an amount of 0.1 mass % or more and 5 mass % or less, and further contains rhodium (Rh), wherein a metallographic structure comprised of fiber-like elements is observed, and the fiber-like elements of the metallographic structure have an average aspect ratio of 150 or more and have an average length of 25 μm or less in a minor axis direction.

<2> A noble metal tip for spark plug described in the above section <1>, which contains rhodium (Rh) in an amount of 3 mass % or more and less than 30 mass %.

<3> A noble metal tip for spark plug described in the above section <1> or <2>, which further contains at least one of ruthenium (Ru) and nickel (Ni).

<4> A noble metal tip for spark plug described in the above section <3>, which contains ruthenium (Ru) in an amount of 3 mass % or more and less than 20 mass % and/or nickel (Ni) in an amount of 0.1 mass % or more and less than 5 mass %.

<5> A noble metal tip for spark plug described in any one of the above sections <1> to <4>, which has a film formed on a surface of the tip and containing aluminum oxide.

<6> An electrode for spark plug, comprising a noble metal tip for spark plug described in any one of the above sections <1> to <5>.

<7> A spark plug comprising an electrode for spark plug described in the above section <6>.

<8> A spark plug in which at least one of a center electrode and a ground electrode has a noble metal tip for spark plug described in the above section <5>, wherein the film is provided at least on a discharge surface of the noble metal tip for spark plug.

According to the present invention, it is possible to provide a noble metal tip for spark plug, etc., which are excellent in durability.

DETAILED DESCRIPTION OF THE INVENTION

First Embodiment

A first embodiment of the present invention is briefly described with reference to FIGS. 1 to 5. In the present embodiment, together with a spark plug 1, an electrode for spark plug and a noble metal tip for spark plug which are used in the spark plug 1 are exemplified.

Figure 1:
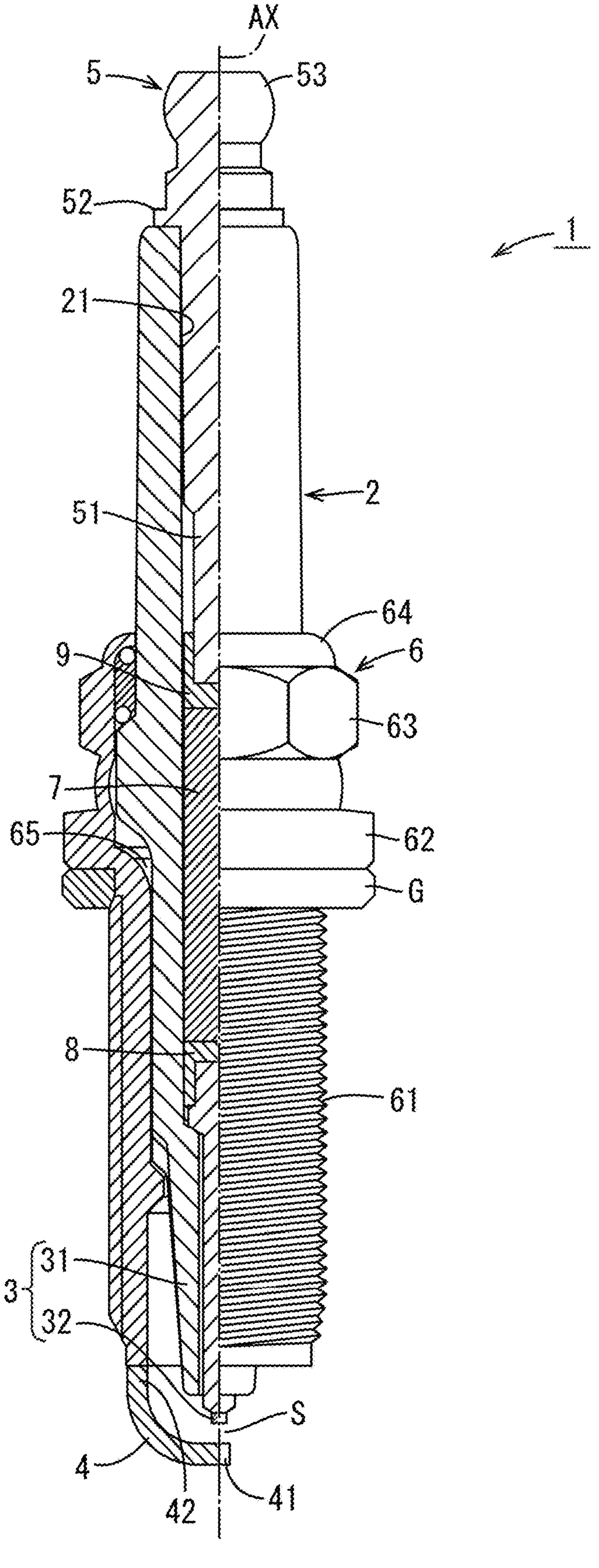
FIG. 1 is a partially sectioned explanatory view of a spark plug of a first embodiment.

FIG. 1 is a partially sectioned explanatory view of the spark plug 1 of the first embodiment. A vertically extending straight line (alternate long and short dash line) shown in FIG. 1 represents the axis AX of the spark plug 1. The forward end side of the spark plug 1 is disposed on the lower side of FIG. 1, and the lower end side of the spark plug 1 is disposed on the upper side of FIG. 1. Notably, in FIG. 1, the outward appearance of the spark plug 1 is shown on the right side of the axis AX, and a sectional view of the spark plug 1 is shown on the left side of the axis AX.

The spark plug 1 is attached to an automotive engine (an example of an internal combustion engine) and is used for igniting an air-fuel mixture within a combustion chamber of the engine. The spark plug 1 mainly includes an insulator 2, a center electrode 3, a ground electrode 4, a metallic terminal member 5, a metallic shell 6, a resistor element 7, and seal members 8 and 9.

The insulator 2 is an approximately cylindrical member extending in the vertical direction and having a penetration hole 21 formed therein. The insulator 2 is formed of a ceramic material such as alumina.

The metallic shell 6 is a member used when the spark plug 1 is attached to the engine (specifically, an engine head). The metallic shell 6 has the shape of a vertically extending cylinder as a whole and is formed of an electrically conductive metal material (for example, low carbon steel). A screw portion 61 is formed on an outer surface of a forward end portion of the metallic shell 6. Also, an annular bearing portion 62 protruding outward is formed on the rear end side of the screw portion 61. Notably, a ring-shaped gasket G is fitted onto a rear end (so-called screw neck) of the screw portion 61. Furthermore, a tool engagement portion 63 is provided on the rear end side of the metallic shell 6. When the metallic shell 6 is attached to the engine, a tool such as a wrench is engaged with the tool engagement portion 63. A crimp portion 64 bent radially inward is provided at a rear end portion of the metallic shell 6.

Also, the metallic shell 6 has a through hole 65 formed therein and penetrating therethrough in the vertical direction. The insulator 2 is inserted into the through hole 65, thereby being held inside the metallic shell 6. The rear end of the insulator 2 greatly projects from the rear end of the metallic shell 6 toward the outside (the upper side of FIG. 1). In contrast, the forward end of the insulator 2 slightly projects from the forward end of the metallic shell 6 toward the outside (the lower side of FIG. 1).

The center electrode 3 is disposed inside the insulator 2, which is fitted into the metallic shell 6. The center electrode (an example of the electrode for spark plug) 3 includes a rod-shaped center electrode body 31 extending along the vertical direction, and a circular columnar (disk-shaped) tip (igniting section) 32 attached to the forward end of the center electrode body 31. The center electrode body 31 is a member which is shorter than the insulator 2 and the metallic shell 6 in terms of length in the longitudinal direction. The center electrode body 31 is held in the penetration hole 21 of the insulator 2 such that a forward end portion of the center electrode body 31 is exposed to the outside. The rear end of the center electrode body 31 is accommodated in the insulator 2. The center electrode body 31 is formed of nickel (Ni) or a nickel-based alloy which contains nickel in the largest amount (e.g., NCF600, NCF601, or the like). Notably, the center electrode body 31 may have a two-layer structure including a sheath portion (base material) formed of nickel or a nickel-based alloy, and a core portion embedded in the sheath portion. In this case, the core portion is preferably formed of copper (Cu), which is higher in heat conductivity than the sheath portion, or a copper-based alloy which contains copper in the largest amount. Notably, the details of the tip 32 of the center electrode 3 will be described later.

The metallic terminal member 5 is a rod-shaped member extending in the vertical direction and is attached in such a manner that the metallic terminal member 5 is inserted into a rear end portion of the penetration hole 21 of the insulator 2. The metallic terminal member 5 is disposed in the insulator 2 (the penetration hole 21) to be located on the rear end side of the center electrode 3. The metallic terminal member 5 is formed of an electrically conductive metallic material (for example, low carbon steel). Notably, the surface of the metallic terminal member 5 may be plated with, for example, nickel for the purpose of, for example, preventing corrosion.

The metallic terminal member 5 has a rod-shaped leg portion 51 disposed on the forward end side, a flange portion 52 disposed on the rear end side of the leg portion 51, and a cap attachment portion 53 disposed on the rear end side of the flange portion 52. The leg portion 51 is inserted into the penetration hole 21 of the insulator 2. The flange portion 52 is a portion which is exposed from a rear end portion of the insulator 2 and engaged with the rear end portion of the insulator 2. The cap attachment portion 53 is a portion to which a plug cap (not shown) with a high voltage cable connected thereto is attached. A high voltage for generating spark discharge is externally applied to the metallic terminal member 5 through the cap attachment portion 53.

The resistor element 7 is disposed in the penetration hole 21 of the insulator 2 to be located between the forward end of the metallic terminal member 5 (the forward end of the leg portion 51) and the rear end of the center electrode 3 (the rear end of the center electrode body 31). The resistor element 7 has a resistance of, for example, 1 kΩ or larger (for example, 5 kΩ) and has, for example, a function of reducing radio noise generated as a result of generation of spark. The resistor element 7 is formed of, for example, a composition including glass particles (main component), ceramic particles other than the glass particles, and an electrically conductive material.

A gap is provided between the forward end of the resistor element 7 and the rear end of the center electrode 3 within the penetration hole 21, and an electrically conductive seal member 8 is disposed so as to fill this gap. Also, another gap is provided between the rear end of the resistor element 7 and the forward end of the metallic terminal member 5 within the penetration hole 21, and an electrically conductive seal member 9 is disposed so as to fill this gap. The seal members 8 and 9 are formed of an electrically conductive composition; for example, a composition containing particles of glass (for example, $B_2O_3$—$SiO_2$ glass) and particles of metals (Cu, Fe, etc.).

The ground electrode 4 is comprised of a plate piece which is bent midway to have an approximately L-like shape as a whole, and its rear end portion 42 is joined to the forward end of the metallic shell 6. A forward end portion 41 of the ground electrode 4 is disposed to face a forward end portion (the tip 32) of the center electrode 3 with a spacing formed therebetween. The ground electrode 4 and the metallic shell 6 are joined together by means of, for example, a welding technique such as resistance welding or laser welding. As a result, the ground electrode 4 and the metallic shell 6 are electrically connected to each other. As in the case of the metallic shell 6, the ground electrode 4 is formed of, for example, nickel or a nickel-based alloy.

A space S is present between the tip 32 at the forward end portion of the center electrode 3 and the forward end portion 41 of the ground electrode 4. When a high voltage is applied between the center electrode 3 and the ground electrode 4, in the space S, spark discharge occurs approximately along the axis AX.

Figure 2:
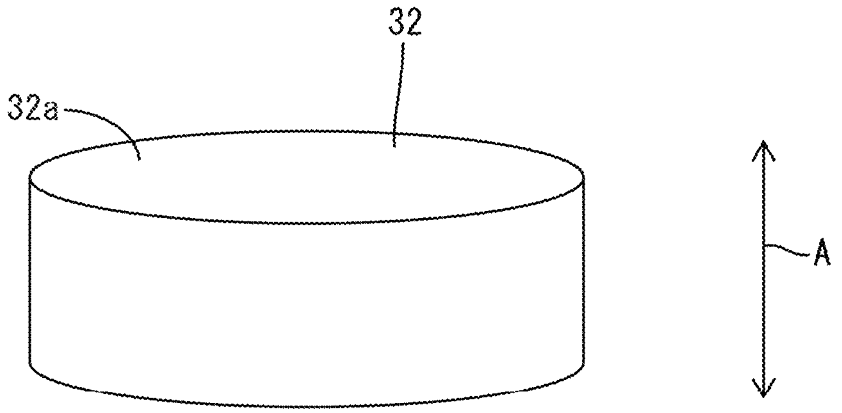
FIG. 2 is a perspective view of a tip.

Next, the tip 32 will be described in detail. FIG. 2 is a perspective view of the tip 32. The tip (an example of the noble metal tip for spark plug) 32 is a member attached to the forward end portion of the center electrode 3 as an igniting portion and has a circular columnar shape (disk-like shape). An upper surface 32*a* and a lower surface of the tip 32 have a circular shape, and the tip 32 is attached in such a manner that the upper surface 32*a* comes into contact with the lower end surface of the rod-shaped center electrode body 31. The tip 32 and the center electrode body 31 are joined together by means of a welding technique such as resistance welding or laser welding.

The tip 32 is formed of an iridium-based alloy which contains iridium (Ir) as a main component and also contains other components such as aluminum (Al), etc. Specifically, the tip 32 is formed of an iridium-based alloy which contains iridium (Ir) in an amount of 50 mass % or more and aluminum (Al) in an amount of 0.1 mass % or more and 5 mass % or less and further contains rhodium (Rh).

The tip 32 formed of such an iridium-based alloy has a metallographic structure in which fiber-like elements are observed.

Figure 3:
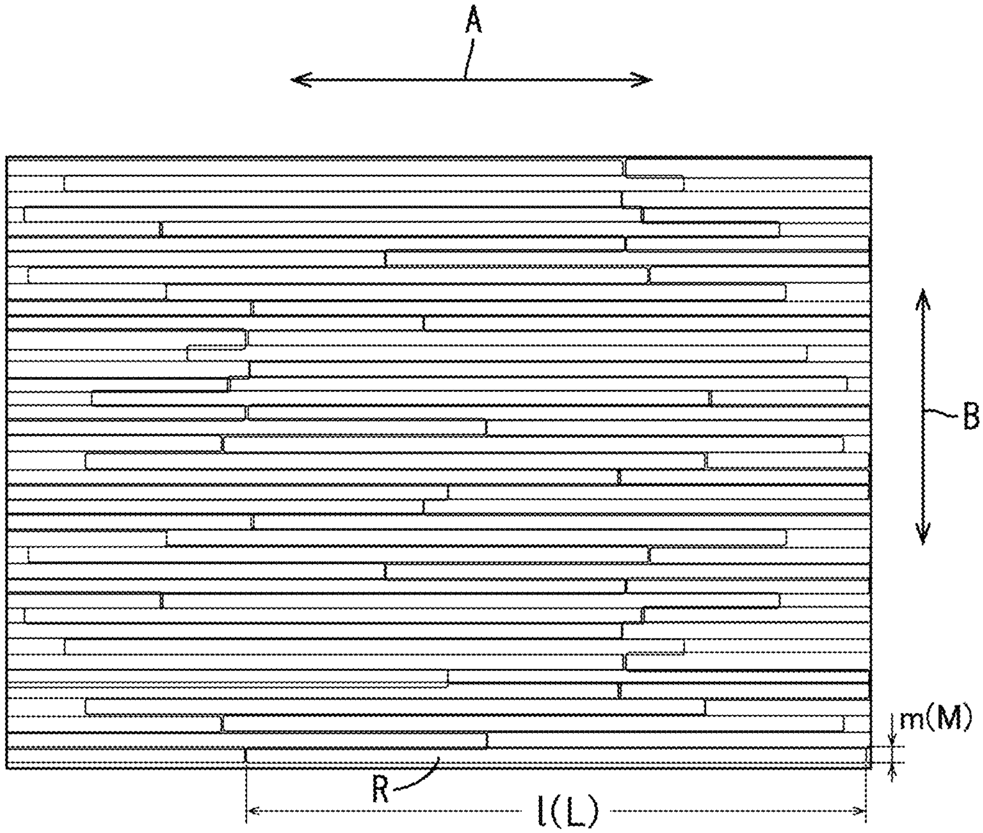
FIG. 3 is an explanatory view schematically representing a metallographic structure comprised of fiber-like elements contained in the tip.

FIG. 3 is an explanatory view schematically representing a metallographic structure comprised of fiber-like elements contained in the tip 32. FIG. 3 shows the fiber-like elements R of the metallographic structure which are formed of the iridium-based alloy and extend in the horizontal direction. Notably, in the present specification, the fiber-like elements of the metallographic structure formed of the iridium-based alloy may be referred to as the "fiber-like structural element." The fiber-like structural element R is formed as a result of a material being stretched during hot working in the method for producing the tip 32, which will be described later. Notably, a two-way arrow A shown in FIGS. 2 and 3 represents the longitudinal direction of the fiber-like structural element R (namely, the extending direction of the fiber-like structural element R). The tip 32 is attached so that the longitudinal direction of the fiber-like structural element R (the extending direction represented by the two-way arrow A) coincides with the direction of the axis AX of the spark plug 1 (in other words, becomes parallel to the axis AX).

The aspect ratio of the fiber-like structural element (crystal grain) R is obtained by the following method. First, the tip 32 is cut along a plane containing the axis AX of the spark plug 1, and the cut surface is polished so as to obtain a polished surface. FIG. 3 shows a cut surface (polished surface) of the tip 32 obtained by cutting the tip 32 along a plane containing the axis AX (the direction of the two-way arrow A). Subsequently, this polished surface is observed under an FE-SEM (Field Emission Scanning Electron Microscope) and the maximum length l of the fiber-like structural element (crystal grain) R in the direction parallel to the axis AX (the direction of the two-way arrow A shown in FIG. 3) and the maximum length m of the fiber-like structural element (crystal grain) R in the direction orthogonal to the axis AX (the direction of a two-way arrow B shown in FIG. 3) are measured. The maximum lengths l and m of each of a plurality of fiber-like structural elements R are measured, and the ratio l/m of each fiber-like structural element R is calculated. The average of the calculated ratios l/m (for example, the average L/M of the ratios l/m of twenty crystal grains) is used as the aspect ratio of the fiber-like structural elements (crystal grains) R. Notably, of the maximum lengths L and M (average values), the smaller maximum length (M) is the average length of the fiber-like structural elements (crystal grains) R in the minor axis direction. Also, the average length of the fiber-like structural elements (crystal grains) R in the major axis direction is L.

Also, in the tip 32 formed of the iridium-based alloy, the average value L/M of the aspect ratios of the fiber-like elements of the metallographic structure is 150 or greater, and the average length M in the minor axis direction is 25 μm or less. When the aspect ratio (average value) and the average length in the minor axis direction of the fiber-like elements of the metallographic structure fall inside the above-described respective ranges, coming off of crystal grains from the tip 32 is restrained, and the tip 32 has excellent durability.

Notably, the above-described aspect ratio (average value) is preferably 160 or greater. Also, the above-described average length M in the minor axis direction is preferably 14 μm or greater and is preferably 19 μm or less.

The iridium (Ir) content (lower limit) of the iridium-based alloy used for the tip 32 is preferably 55 mass % or greater, more preferably, 60 mass % or greater.

For example, the iridium-based alloy used for the tip 32 contains iridium (Ir) in an amount of 50 mass % or more and aluminum (Al) in an amount of 0.1 mass % or more and 5 mass % or less and may further contain rhodium (Rh) in an amount of 3 mass % or more and less than 30 mass %. Notably, when the aluminum (Al) content of the above-described iridium-based alloy falls inside the above-described range, the tip 32 is excellent in workability, durability, etc. Also, when the rhodium (Rh) content of the above-described iridium-based alloy falls inside the above-described range, the tip 32 is excellent in workability, durability, etc.

Also, the above-described iridium-based alloy may further contain at least one of ruthenium (Ru) and nickel (Ni). In this case, the above-described iridium-based alloy may contain ruthenium (Ru) in an amount of 3 mass % or more and less than 20 mass % and/or nickel (Ni) in an amount of 0.1 mass % or more and less than 5 mass %. Notably, when the ruthenium (Ru) content of the above-described iridium-based alloy falls inside the above-described range, the tip 32 is excellent in workability, durability, etc. Also, when the nickel (Ni) content of the above-described iridium-based alloy falls inside the above-described range, the tip 32 is excellent in workability, durability, etc.

Notably, in the present embodiment, ruthenium (Ru) and nickel (Ni) are optional components and are added to the iridium-based alloy when necessary.

Also, the iridium-based alloy may contain other elements such as platinum (Pt) as optional components so long as the object of the present invention is not impaired.

Figure 4:
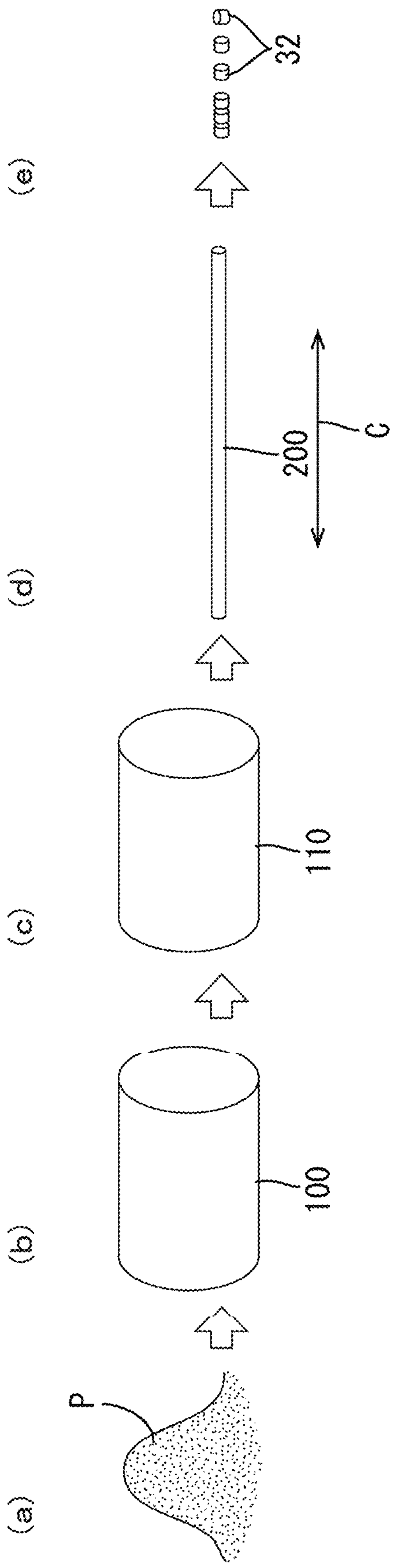
FIG. 4 is an explanatory view schematically representing a method for producing the tip.

Next, the method for producing the tip 32 will be described with reference to FIG. 4. FIG. 4 is an explanatory view schematically representing the method for producing the tip 32. As shown in section (a) of FIG. 4, first, a material powder P whose main component is iridium and which has a predetermined composition ratio is prepared. The material powder P is a mixture of iridium powder, aluminum powder, rhodium powder, etc., which are mixed together to obtain the above-described composition ratio. Notably, the grain size of each powder is approximately the same as the grain size of material powder used when a tip of this kind is produced. As a result of the respective components in powder form being mixed together, the material powder P which is uniform in composition can be obtained.

Next, as shown in section (b) of FIG. 4, the material powder P is press-formed into a predetermined shape (for example, a cylindrical columnar shape) by using a predetermined powder press, thereby yielding a compact 100. Since the compact 100 is produced by means of press forming (powder press forming), the compact 100 which maintains the uniform composition is obtained. In this embodiment, the obtained compact 100 has a cylindrical columnar shape.

After that, the obtained compact 100 is melted by means of arc melting, followed by hot forging, whereby an ingot 110 as shown in section (c) of FIG. 4 is obtained.

In order to prevent segregation of aluminum, which would otherwise occur as a result of a temperature drop after completion of the ingot 110, hot working is performed on the ingot 110 in a state in which the ingot 110 is maintained at red-hot temperature. For example, the obtained cylindrical columnar ingot 110 is stretched in one direction to be elongated by means of hot rotary forging (so-called hot swaging) in which a rotary hammer is used, hot wire rod rolling (for example, hot wire rod rolling in which grooved rolls for forming a caliber are used), or a combination thereof, whereby a rod-shaped material is produced. The produced rod-shaped material is further stretched in one direction by means of, for example, hot wire drawing in which a wire drawing die is used, whereby a wire-like raw material 200 as shown in section (d) of FIG. 4 is obtained. In this manner, the wire-like raw material 200 is formed as a result of the ingot 110 being stretched in one direction by means of hot working. The wire-like raw material 200 has the shape of an elongated circular column, and its cross section (cross section perpendicular to the extending direction) is circular. A two-way arrow C in section (d) of FIG. 4 represents the extending direction of the wire-like raw material 200.

As shown in section (e) of FIG. 4, tips 32 are obtained by cutting the wire-like raw material 200 at predetermined intervals in the extending direction (longitudinal direction) (namely, cutting the wire-like raw material 200 in a direction perpendicular to the extending direction). Such a tip 32 has elongated fiber-like metallographic structural elements (fiber-like structural elements) R which extend along the extending direction C (see FIG. 3). In the above-described manner, the tips 32 can be produced from the material powder P.

Notably, a film 32*x* may be formed on each of the surfaces of tips 32 obtained by cutting the wire-like raw material 200 at predetermined intervals as described above. The film 32*x* is formed by performing heat treatment, under a predetermined high temperature condition, in an oxidizing atmosphere (namely, an atmosphere containing a large amount of an oxidizing gas such as oxygen). This heat treatment may be performed, for example, in an atmospheric atmosphere or an atmosphere to which an oxidizing gas is supplied actively from the outside. These atmospheres are examples of the oxidizing atmosphere. The high temperature condition of this heat treatment is, for example, a temperature range of 800° C. to 950° C.

Figure 5:
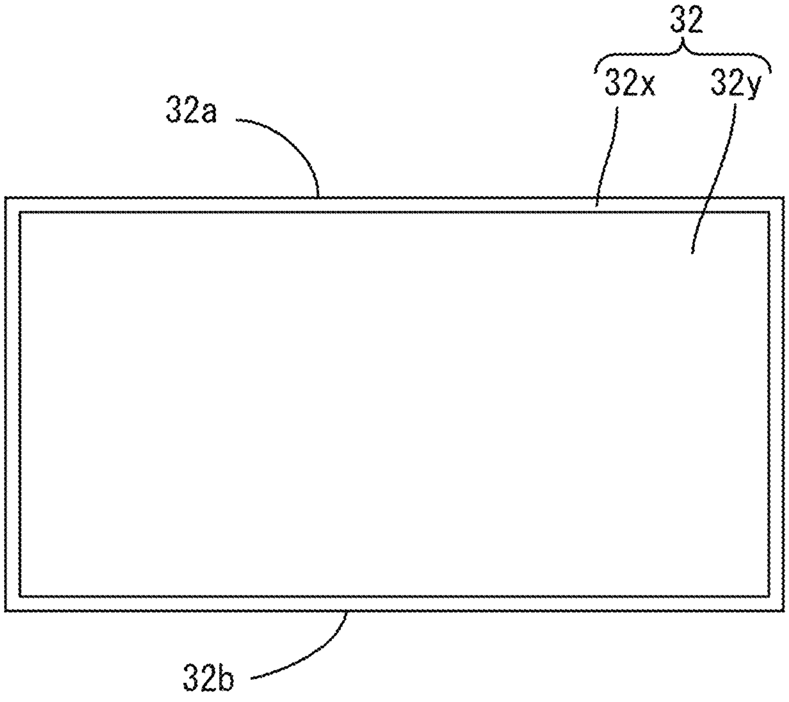
FIG. 5 is a sectional view schematically representing the structure of a tip having a film formed thereon.

FIG. 5 is a sectional view schematically representing the structure of a tip 32 having the film 32*x* formed thereon. FIG. 5 schematically shows a state in which the film 32*x* is formed to cover the entire surface of an inner portion 32*y* of the tip 32. The film 32*x* contains aluminum oxide as a main component and generally has a thickness of about 1 μm to 10 μm. In the present specification, the term "aluminum oxide" means a substance obtained as a result of oxidation of aluminum (namely, oxide of aluminum) and may be, for example, $Al_2O_3$ or aluminum oxides represented by other chemical formulas.

Although the tip 32 before being subjected to heat treatment (namely, one obtained by cutting the wire-like raw material 200 into a tip shape) contains not only aluminum (Al) but also other metal elements such as iridium (Ir) and rhodium (Rh), aluminum reacts with oxygen easily as compared with such other metal elements (metal elements used for the tip 32). Therefore, it is assumed that, as a result of the above-described heat treatment, a film containing aluminum oxide is mainly formed on the surface of the tip 32. Notably, of the tip 32, the inner portion 32*y* covered with the film 32*x* contains substantially no aluminum oxide (oxygen). It is assumed that, in the inner portion 32*y*, aluminum is not present in the form of oxide but is present as a non-oxide substance (specifically, metal aluminum).

As described above, in the case where the film 32*x* containing aluminum oxide is formed on the surface of the tip 32, iridium present in the tip 32 (specifically, in the inner portion 32*y*) (in particular, iridium near the surface) is protected by the film 32*x*, whereby volatilization and oxidation of iridium (Ir) are suppressed. As a result, the durability of the tip 32 is enhanced further. Notably, in the case where aluminum oxide invades the inner portion 32*y*, intergranular cracking may occur due to volume expansion under a high temperature condition (for example, 1,100° C. to 1,200° C.). Therefore, it is preferred that, in the inner portion 32*y*, aluminum be present in the form of metal aluminum.

Presence of the film 32*x* containing aluminum oxide can be confirmed by using, for example, a scanning electron microscope equipped with an energy dispersive X-ray analyzer (SEM-EDS). Also, the fiber-like elements of the metallographic structure as described above are observed in the inner portion 32*y* of the tip 32.

As shown in FIG. 5, in the case where the tip 32 is attached such that, of the upper and lower surfaces 32*a* and 32*b* of the tip 32, the upper surface 32*a* comes into contact with the lower end surface of the rod-shaped center electrode body 31 (see FIG. 1), the lower surface 32*b* serves as the discharge surface of the spark plug. Notably, a surface of the tip 32 for the center electrode 3, which surface faces the ground electrode 4, serves as the discharge surface of the center electrode 3. Therefore, the tip 32 preferably has the film 32*x* on at least a portion (the lower surface 32*b*) which serves as the discharge surface. Also, the heat treatment for forming the film 32*x* on the tip 32 may be performed at any time so long as the object of the present invention is not impaired. For example, the heat treatment may be performed in a state in which the tip 32 is present solely or in a state in which the tip 32 has been attached to the center electrode body 31.

In the present embodiment, during the production of the tip 32, material components such as iridium and aluminum are uniformly mixed in powder form, and the compact 100 is formed from the obtained material powder P which is maintained in a uniformly mixed state. Therefore, it is possible to prevent a change in the composition of the material powder P in the production process, which change would otherwise occur when powder of aluminum whose specific gravity is small is removed as a result of, for example, being stirred up and frying away.

Also, in the present embodiment, the ingot 110 obtained from the compact 100 is stretched in one direction by means of hot working, while being maintained in a red hot state. Therefore, predetermined fiber-like metallographic structural elements R can be formed in the stretched ingot 110 (namely, the wire-like raw material 200) in a state in which solidifying segregation of alumina or the like is suppressed. Since the tip 32 cut from such a wire-like raw material 200 has the fiber-like metallographic structural elements R formed of a predetermined iridium-based alloy, the tip 32 does not have granular crystal grains which come off easily, and the tip 32 is excellent in durability.

Other Embodiments

In other embodiments, a tip formed of the same material as the tip 32 may be attached to, for example, the forward end portion 41 of the ground electrode 4 shown in FIG. 1 so that the tip attached to the forward end portion 41 of the ground electrode 4 faces the tip 32. Like the tip 32 for the center electrode 3 of the first embodiment, the tip for the ground electrode 4 is provided in such a manner that the longitudinal direction (extending direction) of each fiber-like structural element coincides with the direction of the axis AX (in other words, becomes parallel to the axis AX). The tip for the ground electrode 4 is also excellent in durability, because crystal grains hardly come off. Notably, as in the case of the tip for the center electrode, a film containing aluminum oxide may be formed on the surface of the tip for the ground electrode 4. In this case, it is preferred that the film be formed on at least a surface (discharge surface) of the tip for the ground electrode 4, which surface faces the center electrode 3.

Now, the present invention will be described in further detail on the basis of examples. Notably, the present invention is not limited by the examples.

Examples 1 to 15

Material powders mainly formed of iridium (Ir) were prepared for Examples 1 to 15 in such a manner that the material powders for Examples 1 to 15 have respective composition ratios (mass %) shown in Table 1. Tips of Examples 1 to 15 were produced from the obtained material powders by the same method as the above-described tip producing method (see FIG. 4). Specifically, a compact was produced from each material powder through powder press forming, the obtained compact was melted by arc melting, and an ingot was obtained by means of hot forging. The obtained ingot was hot-worked while being maintained in a red hot state, whereby a thin and long, cylindrical columnar wire-like raw material stretched in one direction was obtained. Subsequently, the wire-like raw material was cut appropriately, whereby cylindrical columnar tips (size: 0.8 mm (diameter)×0.6 mm (thickness)) were obtained.

Comparative Examples 1 to 3

Material powders for Comparative Examples 1 to 3 were prepared in such a manner that the material powders for Comparative Examples 1 to 3 have respective composition ratios (mass %) shown in Table 1. A tip of Comparative Example 1 was produced from the obtained material powder by the same method as the method for producing the tips of Example 1, etc.

Notably, production of a tip of Comparative Example 3 was given up midway because of the following reason. Working of an iridium-based alloy was difficult because of reasons such as excessively high hardness, and an ingot was broken when the ingot was formed into the wire-like raw material by means of hot working.

Also, a tip of Comparative Example 2 was produced by a method different from the method for producing the tips of Example 1, etc. Specifically, an alloy containing iridium and aluminum was arc-melted to produce an ingot, and cutting work was performed on the obtained ingot, whereby the tip of Comparative Example 2 was obtained. Notably, the external shape (size) of the tip of Comparative Example 2 is the same as those of the tips of Example 1, etc.

[State of Metallographic Structure]

The metallographic structure in each of the tips of Examples, etc. was observed. Specifically, each tip was cut along a plane including the extending direction (the direction of the axis of the spark plug), and a polished surface obtained by polishing the cut surface was observed under an FE-SEM. The results are shown in Table 1. Notably, in Table 1, "Fiber-like" means the case where fiber-like metallographic structural elements were observed, and "Granular" means the case where granular metallographic structure elements were observed.

[Aspect Ratio, Etc.]

For each of the tips of Examples, etc., the aspect ratio of the metallographic structural elements was determined. Specifically, for each of the tips of Examples, etc., the average (L/M) of the aspect ratios of twenty metallographic structural elements (crystal grains) in total was obtained. Notably, L is the average length of the metallographic structural elements in the major axis direction, and M is the average length of the metallographic structural elements in the minor axis direction. The specific methods for obtaining the average lengths L and M have been already described above. Table 1 shows the aspect ratios and the average lengths M (in the minor axis direction) of the tips of Examples, etc.

[Test for Evaluating Coming Off of Crystal Grains]

Spark plug test samples were produced by using the tips of Examples, etc. The tips were used as the igniting portions of the center electrodes of the spark plug test samples. The base structure of the spark plug test samples is identical to the structure of the above-described spark plug of the first embodiment.

Notably, a film containing aluminum oxide is formed on each of the surfaces (discharge surfaces, etc.) of the tips of Examples, etc., which are used as the center electrodes (igniting portions) of the spark plug test samples. Heat treatment for forming the film was performed simultaneously with heat treatment for forming a seal member (corresponding to the seal member 8 of the first embodiment) of each spark plug test sample. The heat treatment for forming the film will now be described.

The seal member is formed by sintering an electrically conductive glass powder mixture prepared by mixing particles of glass such as $B_2O_3$—$SiO_2$ glass, powers of metals (Cu, Fe, etc.), etc. Such glass powder mixture was compressively charged into the penetration hole (the penetration hole 21) of a tubular insulator (the insulator 2) which was held inside a metallic shell (the metallic shell 6) and into which a center electrode (the center electrode 3) having a tip welded to its forward end was inserted. Further, a resistor element composition for forming a resistor element (the resistor element 7) was charged in such a manner that the resistor element composition was stacked on the glass powder mixture. The resistor element composition was prepared as follows. Electrical conductive carbon black, ceramic particles, and a predetermined binder were blended and were mixed together with water used as a medium. The resultant slurry was dried, and the resultant dry mixture and glass powder (for example, formed of $B_2O_3$—$SiO_2$ glass material) are mixed and stirred together, whereby the resistor element composition was obtained. Subsequently, a press pin having high heat resistance with a releaser applied to its forward end portion was inserted into the penetration hole of the insulator. Subsequently, in a state in which the press pin had been press-fitted into the penetration hole of the insulator from the side opposite the center electrode, a process for heating the tip and the glass powder mixture, etc. (heat treatment) was performed in an oxidizing atmosphere within a firing furnace, under a high temperature condition (800° C. to 950° C.) equal to or higher than the glass softening point and necessary for oxidizing aluminum on the tip surface, for a predetermined time (for example, about 20 minutes). After that, the heated tip and the heated glass powder mixture, etc. were cooled naturally with the press pin maintained in the press-fitted state, whereby the seal member and the resistor element were formed and a film was formed on the surface of the tip.

Each of the obtained spark plug test samples was attached to a supercharger equipped engine for test, and a test for operating the engine for 200 hours was carried out while maintaining a state in which the air-fuel ratio (air/fuel) of an air fuel mixture was 14, the throttle was fully opened, and the engine speed was 6000 rpm. Notably, the ignition angle of the spark plug test sample during the operation of the engine was set to BTDC35° and the intake pressure was set to −30 KPa. After such a test, the spark plug test sample was detached from the engine, and the tip of the spark plug test sample was observed by using a magnifying glass so as to determine whether or not coming off of crystal grains occurred. The results are shown in Table 1. Notably, in Table 1, "Occurred" shows the case where coming off of crystal grains occurred, and "Not occurred" shows the case where coming off of crystal grains did not occur.

[Test for Evaluating Durability]

Separately from the spark plug test samples used for the above-described test for evaluating coming off of crystal grains, spark plug test samples were produced by using the tips of Examples, etc. Each of the spark plug test samples was attached to a pressurization chamber and a test for repeatedly generating discharge by the spark plug test sample was performed in a nitrogen gas atmosphere pressurized to 0.6 MPa, under the condition of 100 Hz and 3 hours. For each of the spark plug test samples used in the test, a change in mass of the tip caused by the test was determined, and a value obtained by dividing the change amount (g) by the density of the tip obtained in advance before the test was used as a worn volume.

In the case where the worn volume was 0.05 $mm^3$ or greater, the tip was determined to wear severely and lack durability, which is indicated by "X" in Table 1.

In the case where the worn volume was 0.04 $mm^3$ or greater and less than 0.05 $mm^3$, the tip was determined to wear in a smaller amount and have durability, which is indicated by "O" in Table 1.

In the case where the worn volume was 0.03 $mm^3$ or greater and less than 0.04 $mm^3$, the tip was determined to be more excellent in durability, which is indicated by "O+" in Table 1.

In the case where the worn volume was less than 0.03 $mm^3$, the tip was determined to be particularly excellent in durability, which is indicated by "O++" in Table 1.

TABLE 1

| | Material powder composition ratio (wt %) | | | | | Metallographic | Aspect ratio | Average length in minor axis direction | Coming off of crystal | |
|---|---|---|---|---|---|---|---|---|---|---|
| | Ir | Rh | Al | Ru | Ni | structure | L/M | (μm) | grains | Durability |
| Comparative Example 1 | Balance | 20 | 0.02 | | | Fiber-like | 160 | 10 | Not occurred | X |
| Comparative Example 2 | Balance | 20 | 0.05 | | | Granular | 1.2 | 50 | Occurred | ○ |
| Example 1 | Balance | 20 | 0.1 | | | Fiber-like | 170 | 15 | Not occurred | ○ |
| Example 2 | Balance | 20 | 0.5 | | | Fiber-like | 200 | 18 | Not occurred | ○ |
| Example 3 | Balance | 20 | 1.0 | | | Fiber-like | 180 | 16 | Not occurred | ○ |
| Example 4 | Balance | 20 | 5 | | | Fiber-like | 170 | 15 | Not occurred | ○ |
| Comparative Example 3 | Balance | 20 | 7 | | | Unworkable | — | — | — | — |
| Example 5 | Balance | 1 | 0.5 | | | Fiber-like | 160 | 19 | Not occurred | ○ |
| Example 6 | Balance | 3 | 0.5 | | | Fiber-like | 180 | 15 | Not occurred | ○ |
| Example 7 | Balance | 10 | 0.5 | | | Fiber-like | 170 | 14 | Not occurred | ○ |
| Example 8 | Balance | 25 | 0.5 | | | Fiber-like | 150 | 18 | Not occurred | ○ |
| Example 9 | Balance | 20 | 0.5 | 3 | | Fiber-like | 170 | 18 | Not occurred | ○+ |
| Example 10 | Balance | 20 | 0.5 | 6 | | Fiber-like | 180 | 17 | Not occurred | ○+ |
| Example 11 | Balance | 20 | 0.5 | 10 | | Fiber-like | 180 | 19 | Not occurred | ○+ |
| Example 12 | Balance | 20 | 0.5 | 18 | | Fiber-like | 170 | 19 | Not occurred | ○+ |
| Example 13 | Balance | 20 | 0.5 | 10 | 0.1 | Fiber-like | 160 | 16 | Not occurred | ○++ |
| Example 14 | Balance | 20 | 0.5 | 10 | 1 | Fiber-like | 180 | 15 | Not occurred | ○++ |
| Example 15 | Balance | 20 | 0.5 | 10 | 3 | Fiber-like | 160 | 18 | Not occurred | ○++ |

As shown in Table 1, each of the tips of Examples 1 to 15 is formed of an iridium-based alloy, fiber-like metallographic structural elements are observed in its cut surface (polished surface), the average (L/M) of the aspect ratios of the metallographic structural elements is 150 or greater, and the average length M in the minor axis direction is 25 μm or less. It was confirmed that such a tip is excellent in durability, because coming off of crystal grains is restrained.

The tip of Comparative Example 1 shows the case where the aluminum content is less than 0.1 mass %. Since the aluminum content of the tip of Comparative Example 1 is excessively small, the test results show that the tip of Comparative Example 1 has poor durability.

Figure 6:
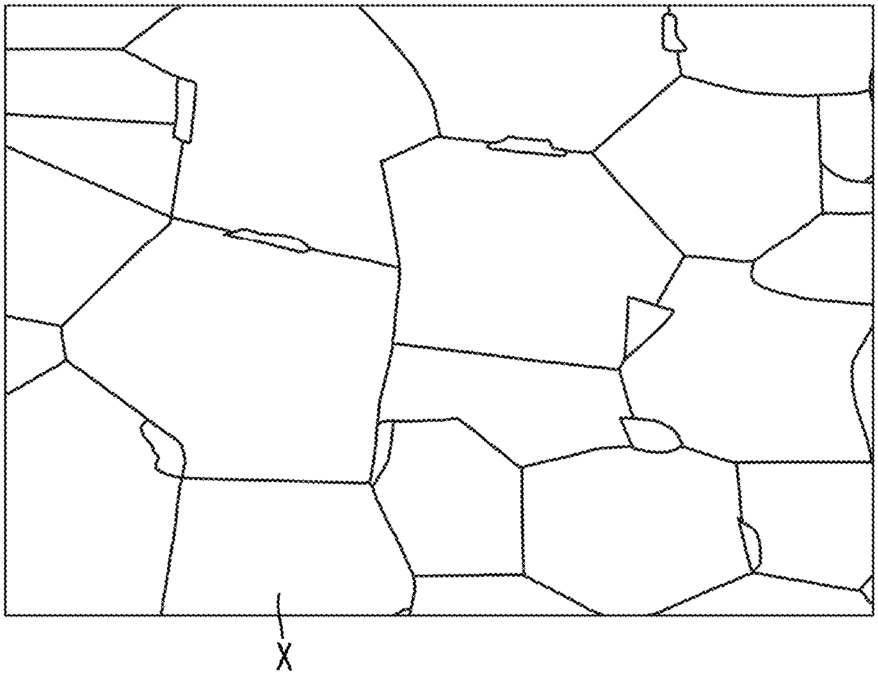
FIG. 6 is an explanatory view schematically representing a metallographic structure contained in a tip of Comparative Example 2.

The tip of Comparative Example 2 shows the case where the metallographic structural elements are granular. FIG. 6 is an explanatory view schematically representing metallographic structural elements contained in the tip of Comparative Example 2. The tip of Comparative Example 2 was obtained from an ingot through cutting work. Therefore, a metallographic structural element comprised of granular crystal grains X having a small aspect ratio was observed in the tip of Comparative Example 2. It was confirmed from the results of the test for evaluating coming off of crystal grains that, in such a tip, the crystal grains X come off easily.

Comparative Example 3 shows the case where the aluminum content of the iridium-based alloy is high. In Comparative Example 3, as described above, machining was difficult because of reasons such as excessively high hardness of the iridium-based alloy.

Notably, as shown in Table 1, it was confirmed that, of the tips of Examples 1 to 15, the tips of Examples 9 to 15 are more excellent in durability than the tips of Examples 1 to 8, and, among them, the tips of Examples 13 to 15 are particularly excellent in durability.

[Checking of Film]

Figure 7:
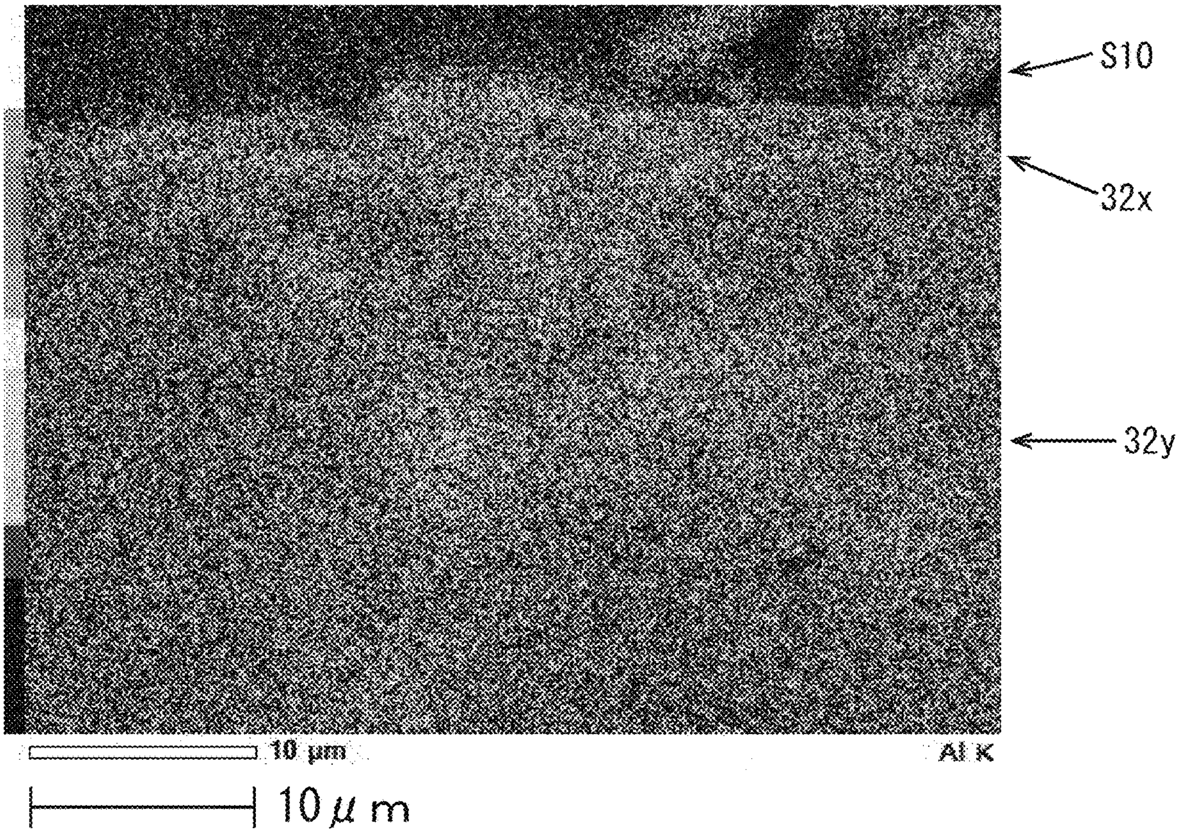
FIG. 7 is an image obtained by visualizing the distribution of aluminum, by means of EDS element mapping, on an SEM image of a cut surface near the surface of a tip of Example 14.
Figure 8:
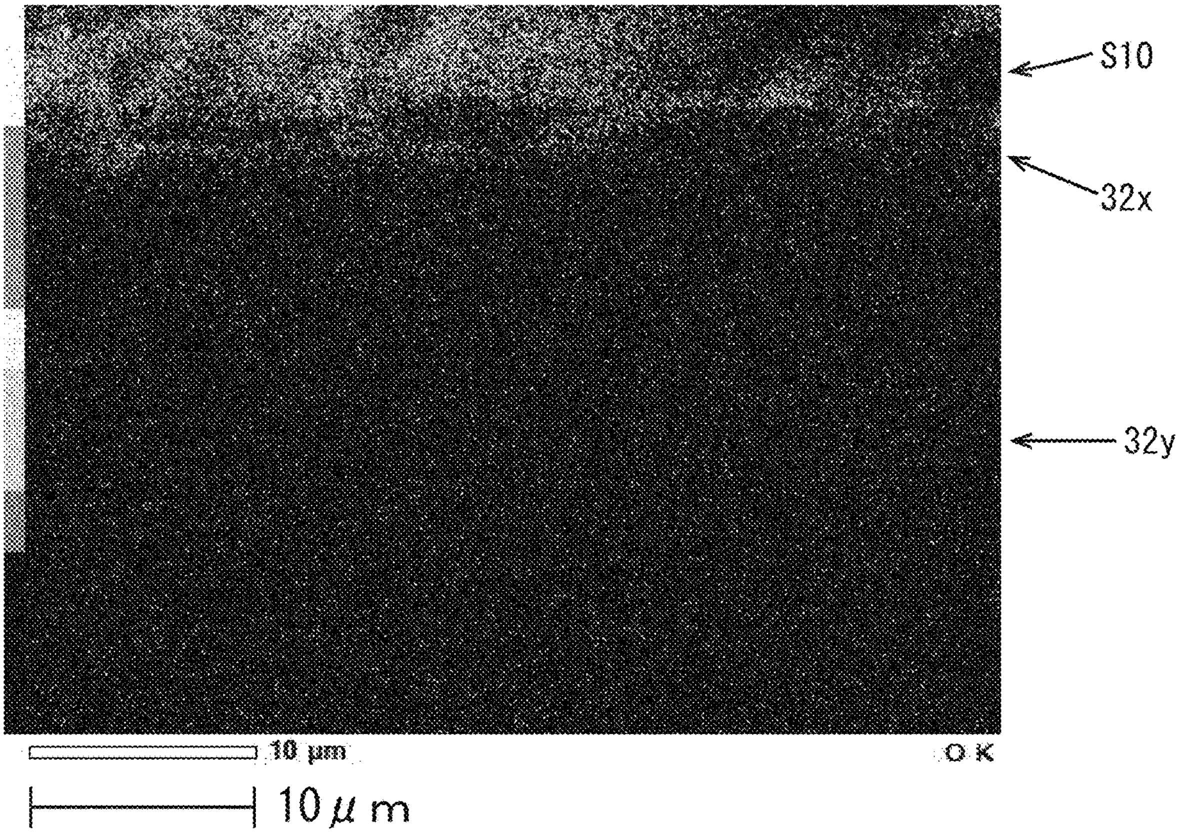
FIG. 8 is an image obtained by visualizing the distribution of oxygen, by means of EDS element mapping, on the SEM image of the cut surface near the surface of the tip of Example 14.

Here, the tip of Example 14 was chosen as a representative of the tips of Examples, and the film formed on the surface (discharge surface) of the tip of Example 14 was checked by using an SEM-EDS. The results are shown in FIGS. 7 and 8. FIG. 7 is an image obtained by visualizing the distribution of aluminum, by means of EDS element mapping, on an SEM image of a cut surface near the surface of the tip of Example 14. As shown in FIG. 7, aluminum is uniformly dispersed in the entire tip. Namely, aluminum is uniformly dispersed not only in the film 32*x* portion (surface layer) but also in the inner portion 32*y* located inward of the film 32*x*. Notably, a symbol S10 in FIG. 7 shows the space (this is also true in FIG. 8).

FIG. 8 is an image obtained by visualizing the distribution of oxygen, by means of EDS element mapping, on an SEM image of a cut surface near the surface of the tip of Example 14. As shown in FIG. 8, oxygen is present only in the film 32*x* portion (surface layer) and is not present in the inner portion 32*y*. Since oxygen is present in the surface layer, it can be said that the film 32*x* containing aluminum oxide is formed.

Notably, as shown in FIG. 8, oxygen was found only in the surface layer (film 32*x*) and was not found in the inner portion 32*y*. Therefore, it can be said that no aluminum oxide is contained in the inner portion 32*y*. In the case where only the film 32*x*, which is the surface layer, contains aluminum oxide and the inner portion 32*y* contains no aluminum oxide, it is possible to prevent occurrence of problems, such as intergranular cracking, which would otherwise occur due to volume expansion of the tip at high temperature.

DESCRIPTION OF REFERENCE NUMERALS

1: spark plug, 2: insulator, 3: center electrode (electrode for spark plug), 31: center electrode body, 32: tip (noble metal tip for spark plug), 4: ground electrode, 5: metallic terminal, 6: metallic shell, 7: resistor element, 8, 9: seal member

What is claimed is:

1. A noble metal tip for a spark plug comprising:
iridium (Ir) in an amount of 50 mass % or more; aluminum (Al) in an amount of 0.1 mass % or more and 5 mass % or less; and
rhodium (Rh),
wherein a metallographic structure comprised of fiber-like elements, the fiber-like elements of the metallographic structure having an average aspect ratio of 150 or more and have an average length of 25 μm or less in a minor axis direction.

2. The noble metal tip for spark plug according to claim 1, which contains rhodium (Rh) in an amount of 3 mass % or more and less than 30 mass %.

3. The noble metal tip for spark plug according to claim 1, which further contains at least one of ruthenium (Ru) and nickel (Ni).

4. The noble metal tip for spark plug according to claim 3, which contains ruthenium (Ru) in an amount of 3 mass % or more and less than 20 mass % and/or nickel (Ni) in an amount of 0.1 mass % or more and less than 5 mass %.

5. The noble metal tip for spark plug according to claim 1, which has a film formed on a surface of the tip and containing aluminum oxide.

6. A spark plug in which at least one of a center electrode and a ground electrode has a noble metal tip for spark plug according to claim 5,
wherein the film is provided at least on a discharge surface of the noble metal tip for spark plug.

7. An electrode for a spark plug, comprising a noble metal tip for spark plug according to claim 1.

8. A spark plug comprising an electrode for spark plug according to claim 7.

* * * * *